US010024274B2

(12) United States Patent
Fujimoto et al.

(10) Patent No.: US 10,024,274 B2
(45) Date of Patent: Jul. 17, 2018

(54) CONTROL APPARATUS OF ENGINE

(71) Applicant: Mazda Motor Corporation, Aki-gun, Hiroshima (JP)

(72) Inventors: Masahiko Fujimoto, Hiroshima (JP); Hiroyuki Yamashita, Hiroshima (JP); Keiji Araki, Hatsukaichi (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 0 days.

(21) Appl. No.: 15/216,073

(22) Filed: Jul. 21, 2016

(65) Prior Publication Data
US 2017/0022938 A1    Jan. 26, 2017

(30) Foreign Application Priority Data

Jul. 22, 2015  (JP) ................................. 2015-144786

(51) Int. Cl.
| *F02B 47/02* | (2006.01) |
| *F02M 25/03* | (2006.01) |
| *F02M 25/022* | (2006.01) |
| *F01N 5/02* | (2006.01) |
| *F02D 41/30* | (2006.01) |
(Continued)

(52) U.S. Cl.
CPC ............. *F02M 25/03* (2013.01); *F01N 5/02* (2013.01); *F02B 47/02* (2013.01); *F02D 41/3023* (2013.01); *F02D 41/402* (2013.01); *F02M 25/0224* (2013.01); *F02M 25/0227* (2013.01); *F01N 2240/02* (2013.01); *F02D 41/0025* (2013.01); *F02M 61/14* (2013.01);
(Continued)

(58) Field of Classification Search
CPC .... F02M 25/03; F02M 61/14; F02M 25/0224; F02M 25/0227; F02D 41/402; F02D 41/3023; F02D 41/0025; F01N 5/02; F01N 2240/02; F02B 47/02; Y02T 10/44; Y02T 10/16; F05C 2251/048
See application file for complete search history.

(56) References Cited

U.S. PATENT DOCUMENTS

| 2004/0003781 A1* | 1/2004 | Yuki ....................... F02B 47/02 123/25 C |
| 2007/0151528 A1* | 7/2007 | Hedman ................. F02B 47/02 123/25 D |

FOREIGN PATENT DOCUMENTS

| JP | H03115730 A | 5/1991 |
| JP | 2009168039 A | 7/2009 |
(Continued)

*Primary Examiner* — Hung Q Nguyen
(74) *Attorney, Agent, or Firm* — Alleman Hall Creasman & Tuttle LLP

(57) ABSTRACT

A control apparatus of an engine including a cylinder into which a piston is reciprocatably fitted is provided. The apparatus includes a fuel injector, a water injector, and a controller. The controller includes an engine load determining module for receiving a parameter and determining whether an engine operating range is within a low high load range or a high load range. Within the low load range, the controller controls the fuel injector to inject fuel into a center region of a combustion chamber. Within the high load range, the controller controls the fuel injector to inject the fuel in a period between a latter half of compression stroke and an early half of expansion stroke, and the water injector to inject supercritical water or subcritical water toward a crown surface of the piston in a period that is after the injection and before a mixture gas ignition.

8 Claims, 12 Drawing Sheets

(51) Int. Cl.
*F02D 41/40* (2006.01)
*F02M 61/14* (2006.01)
*F02D 41/00* (2006.01)

(52) U.S. Cl.
CPC ......... *F05C 2251/048* (2013.01); *Y02T 10/16* (2013.01); *Y02T 10/44* (2013.01)

(56) References Cited

FOREIGN PATENT DOCUMENTS

| JP | 2012046784 A | * | 3/2012 | ............. C25D 11/04 |
|----|--------------|---|--------|--------------------------|
| JP | 2013194622 A |   | 9/2013 |                          |
| JP | 2014517185 A |   | 7/2014 |                          |

* cited by examiner

CONTROL APPARATUS OF ENGINE

BACKGROUND

The present invention relates to a control apparatus of an engine having a cylinder into which a piston is reciprocatably fitted.

Conventionally, in order to improve fuel consumption of an engine, it is desirable to reduce a loss caused by release of thermal energy of combustion gas from a wall surface of a combustion chamber to an outside of the engine, in other words, a cooling loss.

In this regard, for example, JP2013-194622A discloses an engine in which, within an engine operating range where an engine load is low, an air layer is formed around an outer circumferential region of a combustion chamber by causing fuel to stagnate within a center region of the combustion chamber, so as to reduce by the air layer release of thermal energy of combustion gas to an outside of the engine.

According to the engine of JP2013-194622A, a cooling loss can be reduced and fuel consumption can be improved. However, with the engine, the cooling loss is only reduced within the operating range where the engine load is low, and the fuel consumption cannot sufficiently be improved.

SUMMARY

The present invention is made in view of the above situations and aims to provide a control apparatus of an engine, which is capable of reducing a cooling loss over a wide engine load range.

According to one aspect of the present invention, a control apparatus of an engine including an engine body and a cylinder into which a piston is reciprocatably fitted, is provided. The apparatus includes a fuel injector for injecting fuel into a combustion chamber formed inside the cylinder, a water injector for injecting one of supercritical water and subcritical water into the combustion chamber, and a controller for controlling various parts of the engine, the various parts including the fuel injector and the water injector. The water injector is attached to a predetermined position of the engine body to be capable of injecting the one of the supercritical water and the subcritical water toward a crown surface of the piston. The controller includes an engine load determining module for receiving at least a parameter of a load of the engine obtained based on an accelerator opening, and determining whether an operating range of the engine body is within a low load range where the engine load is a predetermined reference load or below or a high load range where the engine load is above the predetermined reference load. When the engine body is operated within the low load range, the controller outputs a control signal to the fuel injector to inject the fuel into a center region of the combustion chamber so as to form an air layer within an outer circumferential region of the combustion chamber. When the engine body is operated within the high load range, the controller outputs a control signal to the fuel injector to inject the fuel in a period between a latter half of compression stroke and an early half of expansion stroke, and the controller outputs a control signal to the water injector to inject the one of the supercritical water and the subcritical water toward the crown surface of the piston in a period that is after the fuel injection and before an ignition of mixture gas containing the fuel and air.

According to this configuration, a cooling loss can be reduced while achieving suitable combustion over a wide load range. Specifically, within the low load range, an amount of fuel injected into the combustion chamber is small and excess air which does not contribute in the combustion exists within the combustion chamber. In this regard, in the above configuration, the fuel is injected such that the air layer is formed in the outer circumferential region of the combustion chamber within the low load range. Therefore, within the low load range, while achieving suitable combustion by securing required air for the combustion, the cooling loss can be reduced with the air layer formed by the excess air thereof. Whereas within the high load range, since the amount of excess air is small, a rich mixture gas (of which an air excess ratio is small) is locally formed when the air layer is formed as described above. In this regard, in the above configuration, by injecting the water toward the piston crown surface before the mixture gas ignition, the water is attached to the piston crown surface to form a heat insulating layer before the ignition. Therefore, within the high load range, the cooling loss can be reduced by the heat insulating layer with the water while achieving the suitable combustion by suppressing the local formation of the rich mixture gas.

Particularly in the above configuration, the one of the supercritical water and the subcritical water which has a higher density than water in a normal gas phase is used as the water, and this supercritical water etc. is injected into the cylinder when a temperature and pressure of the cylinder are high, which is between the latter half of the compression stroke and the early half of the expansion stroke, so that the water remains on a wall surface of the combustion chamber in a state of the one of the supercritical water and the subcritical water. Therefore, a high heat insulating effect can be obtained by increasing the density of the water of the heat insulating layer. As a result, the cooling loss can be reduced more reliably and fuel consumption can be improved.

Note that, in the present invention, the early half of the compression stroke is a period between 90° CA (crank angle) before a top dead center of the compression stroke (CTDC) and the CTDC.

In the above configuration, a geometric compression ratio of the engine body may be set to be between 18:1 and 35:1. An effective compression ratio of the engine body within the high load range may be set to be between 15:1 and 30:1.

Thus, within the high load range, the effective compression ratio can be set large to increase an engine torque, and the cooling loss can be reduced while suppressing an increase of a smoke production. Specifically, when the effective compression ratio is large, a combustion temperature easily becomes high. Also, if the rich mixture gas is formed under such a state where the combustion temperature easily becomes high, the smoke production easily increases. In this regard, in the above configuration, the heat insulating layer can be formed by the water and not air as described above. Thus, while increasing the effective compression ratio, the cooling loss can be reduced without increasing the smoke production.

Further, in the above configuration, the control apparatus may further include a water processing device for generating the one of the supercritical water and the subcritical water. The water processing device may include a condenser for condensing water vapor contained within exhaust gas discharged from the engine body, and a heater and compressor for increasing the condensed water vapor in temperature and pressure by supplying thermal energy of the exhaust gas to the condensed water vapor.

According to this configuration, the one of the supercritical water and the subcritical water can be generated by using the water vapor within the exhaust gas and the thermal energy of the exhaust gas, and energy efficiency can be increased compared to a case of separately providing a device for generating the water. Here, within the low load range, since the temperature of the exhaust gas is low, it is required that energy be separately supplied in order to generate the one of supercritical water and the subcritical water. In this regard, in the above configuration, the heat insulating layer is formed by air within the low load range as described above, thus, the cooling loss can be reduced over the wide load range while increasing the energy efficiency.

Further, in the above configuration, a heat insulating material may be provided in at least one of wall surfaces of the combustion chamber.

According to this configuration, the cooling loss can be reduced further by providing the heat insulating material in addition to the heat insulating layers formed by air and the water.

BRIEF DESCRIPTION OF THE DRAWINGS

DETAILED DESCRIPTION OF EMBODIMENT (1) Overall Configuration of Engine System FIG. 1 is a view illustrating a configuration of an engine system to which a control apparatus of an engine is applied, according to one embodiment of the present invention. The engine system of this embodiment includes an engine body 1 of a four stroke type, an intake passage 30 for introducing air for combustion into the engine body 1, and an exhaust passage 40 for discharging exhaust gas generated in the engine body 1. The engine body 1 is, for example, a four-cylinder engine having four cylinders 2. Although the kind of fuel which is supplied to the engine body 1 is not limited, in this embodiment, fuel containing gasoline is used. The engine system of this embodiment is mounted on a vehicle, and the engine body 1 is used as a drive source of the vehicle.

Figure 1:
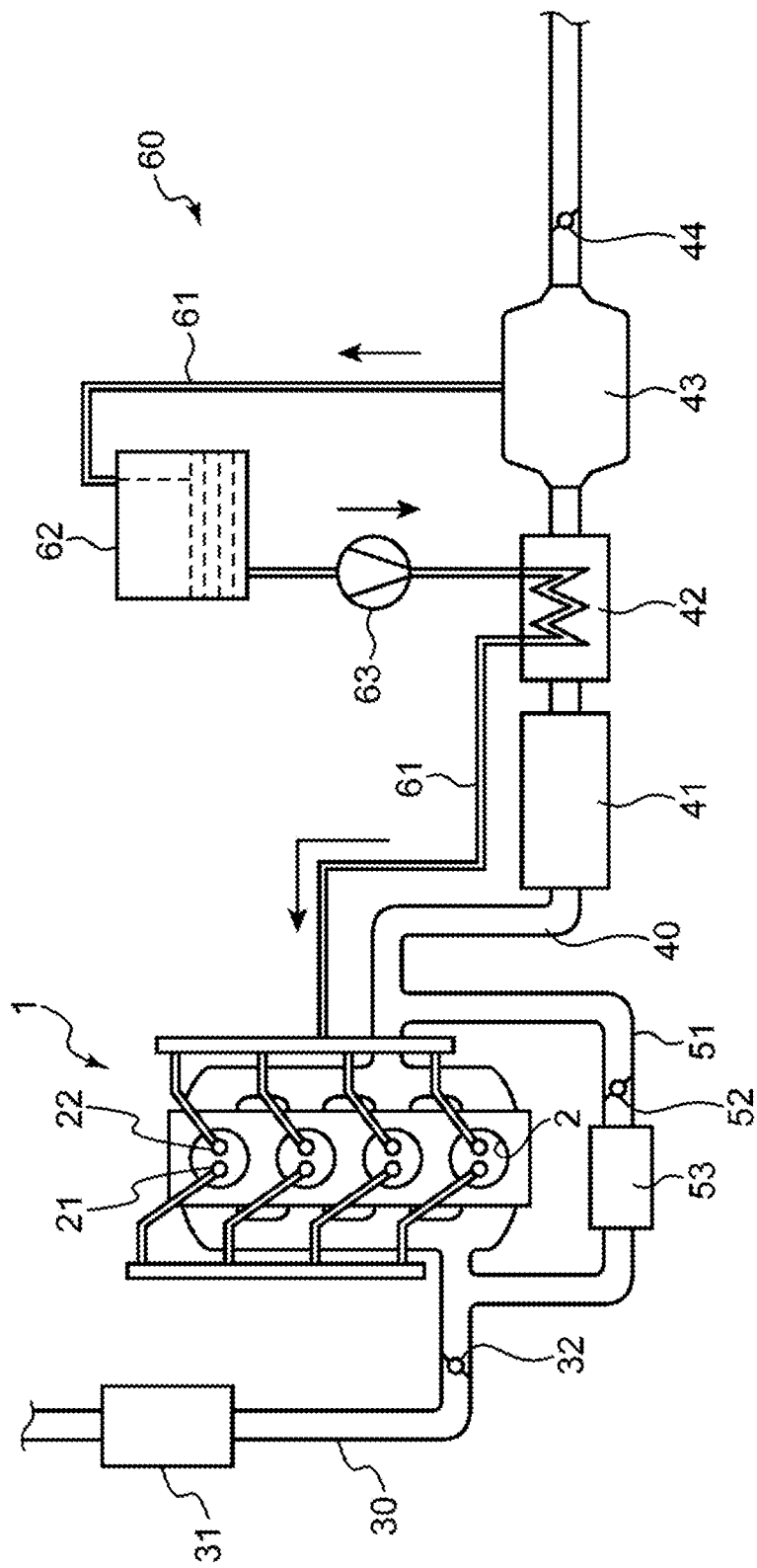
FIG. 1 is a view illustrating a configuration of an engine system according to one embodiment of the present invention.

The intake passage 30 is provided with, in the following order from its upstream side, an air cleaner 31 and a throttle valve 32. The air passes through the air cleaner 31 and the throttle valve 32 and then is introduced into the engine body 1.

The throttle valve 32 opens and closes the intake passage 30. Note that, in this embodiment, while the engine is in operation, the throttle valve 32 is basically kept fully opened or nearly fully opened, and only in a limited operation condition (e.g., the engine is stopped), the throttle valve 32 is closed to block the intake passage 30.

The exhaust passage 40 is provided with, in the following order from its upstream side, a three-way catalyst 41 for purifying the exhaust gas, a heat exchanger 42 (heater and compressor), a condenser 43, and an exhaust shutter valve 44. The heat exchanger 42 and the condenser 43 constitute a part of a later-described exhaust heat recovery device 60 (water processing device).

The exhaust shutter valve 44 stimulates a recirculation of Exhaust Gas Recirculation (EGR) gas to the intake passage 30.

Specifically, with the engine system of this embodiment, an EGR passage 51 communicating a part of the intake passage 30 downstream of the throttle valve 32 with a part of the exhaust passage 40 upstream of the three-way catalyst 41 is formed, and a part of the exhaust gas is recirculated as the EGR gas to the intake passage 30. Further, the exhaust shutter valve 44 opens and closes the exhaust passage 40. When the EGR is performed and pressure inside the exhaust passage 40 is low, an opening of the exhaust shutter valve 44 is narrowed to increase pressure inside an upstream part of the EGR passage 51 so as to stimulate the EGR gas recirculation.

The EGR passage 51 is provided with an EGR valve 52 for opening and closing the EGR passage 51, and an amount of the EGR gas recirculated to the intake passage 30 is controlled by adjusting an opening of the EGR valve 52. Further in this embodiment, the EGR passage 51 is provided with an EGR cooler 53 for cooling the EGR gas passing therethrough, and the EGR gas is recirculated to the intake passage 30 after being cooled by the EGR cooler 53.

The exhaust heat recovery device 60 generates supercritical water by using thermal energy of the exhaust gas. Specifically, with the engine system of this embodiment, the supercritical water is injected into the respective cylinders 2 from water injectors 22 as described later, and the supercritical water is generated by using the exhaust gas.

The exhaust heat recovery device 60 includes the heat exchanger 42 and the condenser 43, and additionally a condensed water passage 61, a water tank 62, and a water injection pump 63. The condensed water passage 61 connects the water injectors 22 with the condenser 43.

The condenser 43 condenses water (water vapor) within the exhaust gas passing through the exhaust passage 40. The water tank 62 stores the condensed water therein. The condensed water generated by the condenser 43 is introduced into the water tank 62 through the condensed water passage 61 and stored in the water tank 62.

The water injection pump 63 sends the condensed water inside the water tank 62 to the water injectors 22 through the heat exchanger 42. The condensed water inside the water tank 62 is increased in temperature and pressure by the water injection pump 63 when being sent. By the water injection pump 63, for example, the condensed water is increased to about 350 K in temperature and about 250 bar in pressure.

The heat exchanger 42 exchanges heat between the condensed water sent by the water injection pump 63 and the exhaust gas passing through the exhaust passage 40. The heat exchanger 42 is an indirect heat exchanger, and the condensed water receives the thermal energy from the exhaust gas when passing through the heat exchanger 42. By passing through the heat exchanger 42, the condensed water is increased more in temperature and pressure from the state where pressure is applied thereto by the water injection pump 63, and becomes supercritical water.

The supercritical water is water with a higher temperature and pressure than at the critical point of water, and has a high density close to liquid while molecules move as actively as gas moves. In other words, the supercritical water is water which does not require latent heat for a phase change into gas or liquid. Although described later in detail, in this embodiment, by injecting the water with such properties into the cylinders 2, a heat insulating layer is formed on a wall surface of a combustion chamber 6 formed in each cylinder 2.

Figure 2:
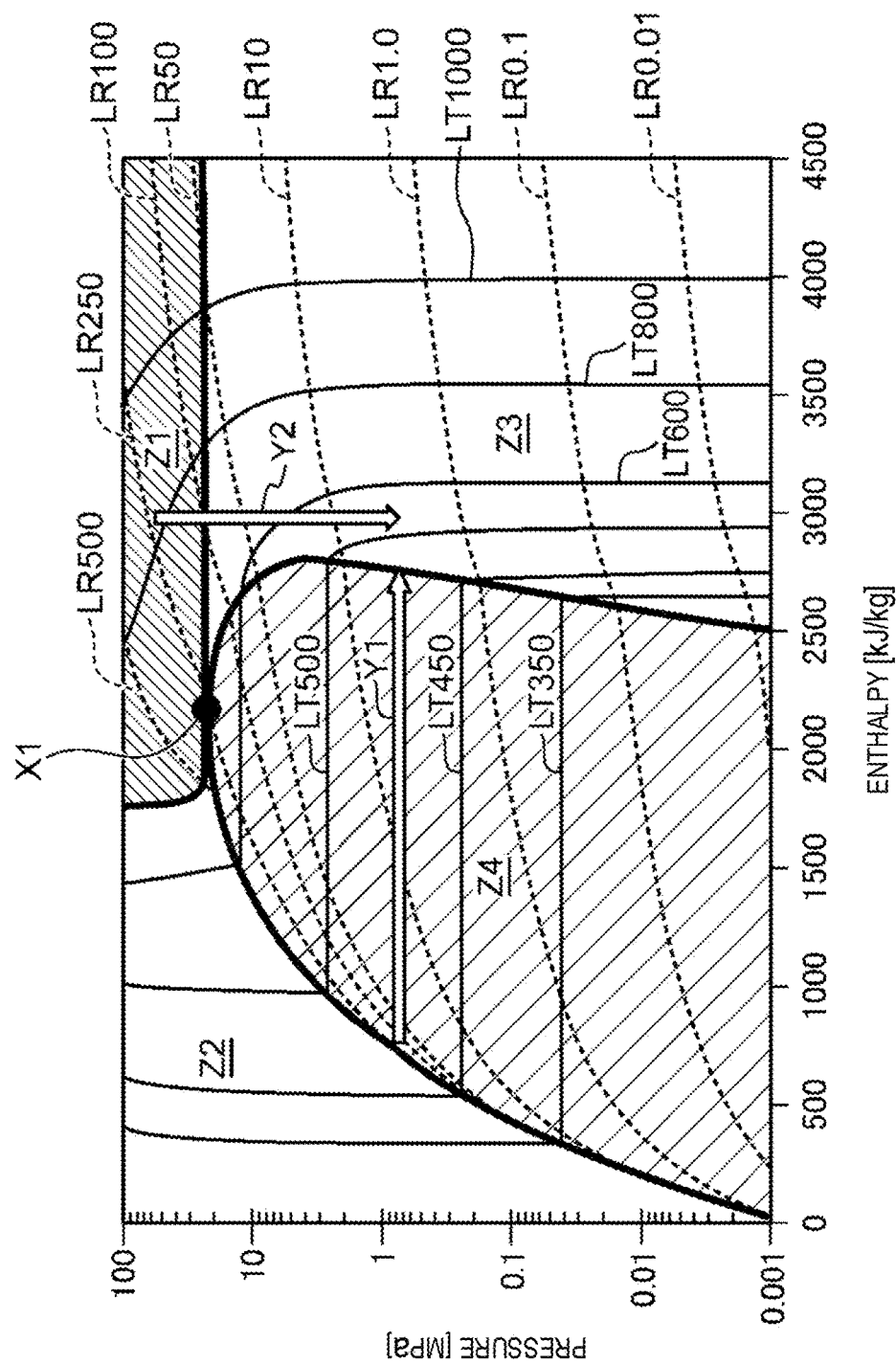
FIG. 2 is a water phase diagram illustrating supercritical water.

A specific description regarding this matter is given with reference to FIG. 2. FIG. 2 is a water phase diagram of which a horizontal axis indicates enthalpy and a vertical axis indicates pressure. In FIG. 2, an area Z2 is an area of liquid, an area Z3 is an area of gas, and an area Z4 is a coexisting area of liquid and gas. Lines LT350, LT400, . . . , LT1000 indicated by solid lines are isothermal lines, each formed by connecting points of the same temperature. The numbers of the lines indicate temperatures (K). For example, LT350 is an isothermal line of 350 K, and LT1000 is an isothermal line of 1,000 K. Further, a point X1 is the critical point and an area Z1 is an area where a temperature and pressure are higher than the critical point X1, and the supercritical water belongs to this area Z1. Specifically, while the critical point of water is at the temperature of 647.3 K and the pressure of 22.12 MPa, the temperature and pressure of the supercritical water are the same or above, in other words, the temperature is 647.3 K or above and the pressure is 22.12 MPa or above.

In FIG. 2, lines LR0.01, LR0.1, . . . , LR500 indicated by dashed lines are isopycnic lines, each formed by connecting points of the same density. The numbers of the lines indicate densities (kg/m$^3$). For example, LR0.01 is an isopycnic line of 0.01 kg/m$^3$, and LR500 is an isopycnic line of 500 kg/m$^3$. As apparent from comparisons of these isopycnic lines LR with the areas Z1 and Z3, the density of the water within the area Z1, in other words, the supercritical water, is about from 50 kg/m$^3$ to 500 kg/m$^3$, which is close to that of water in the liquid phase and much higher than a density of gas.

Note that the supercritical water generated by the engine system and injected into the cylinders 2 preferably has a density of 250 kg/m$^3$ or above.

Further, as indicated by an arrow Y1 in FIG. 2, water in a normal liquid phase requires a high enthalpy to change into gas. In other words, the water in the normal liquid phase requires comparatively high latent heat to change into gas. In this regard, as indicated by an arrow Y2, the supercritical water requires almost no enthalpy, in other words, latent heat, to change into water in a normal gas phase.

Figure 3:
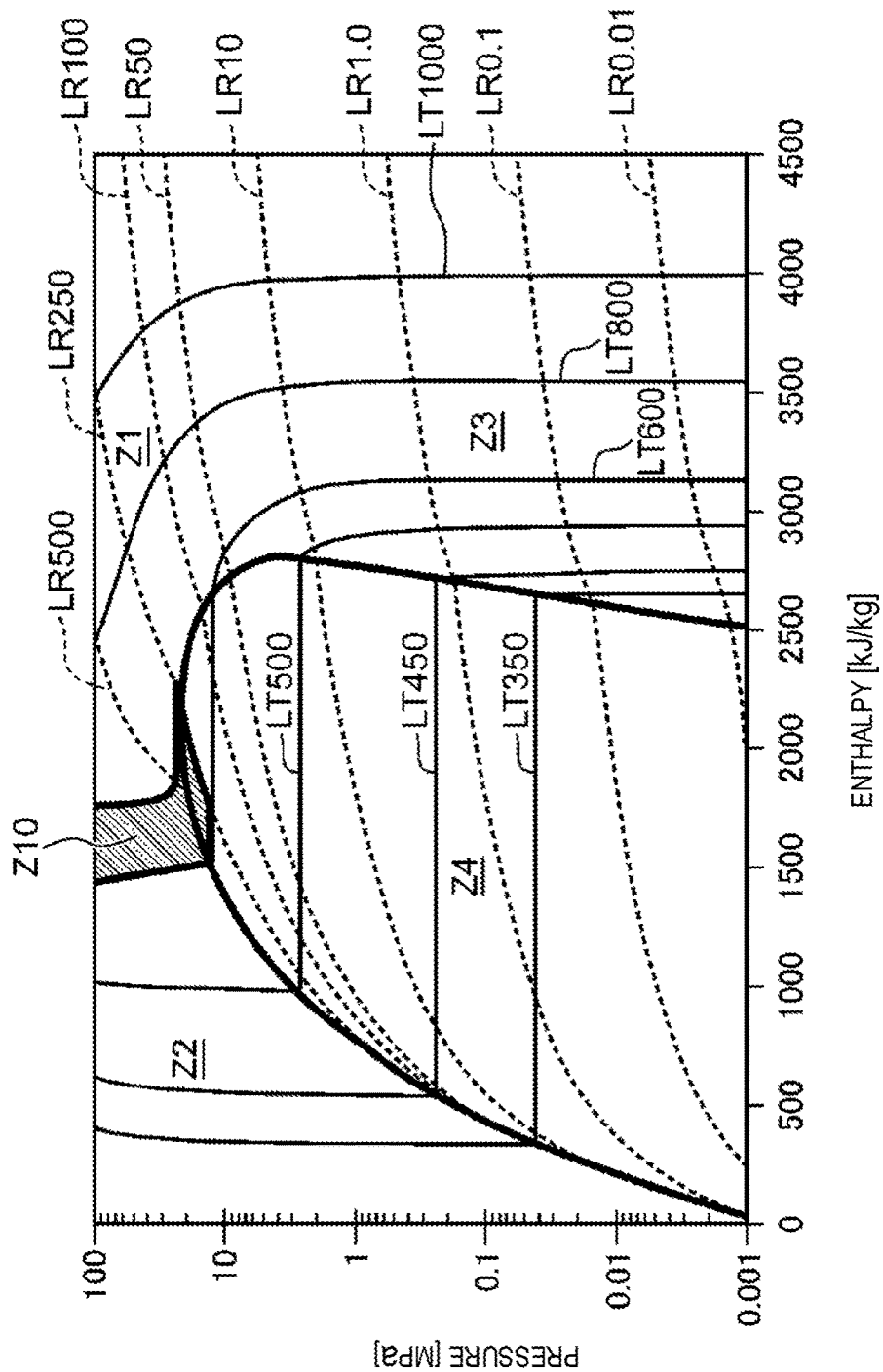
FIG. 3 is a water phase diagram illustrating subcritical water.

Here, as apparent from FIG. 2, water belonging to an area near the area Z1 has a high density and requires low latent heat to change into gas, which are properties similar to the supercritical water. Therefore, although the supercritical water is generated by the exhaust heat recovery device 60 and injected into the cylinders 2 in this embodiment as described above, instead of the supercritical water, subcritical water which is water belonging to the area near the area Z1 may be generated and injected into the cylinders 2. For example, subcritical water within an area Z10 where the temperature is 600 K or above and the density is 250 kg/m$^3$ or above (see FIG. 3) may be generated and injected.

(2) Structure of Engine Body (2-1) Overall Structure

A structure of the engine body 1 is described next.

Figure 4:
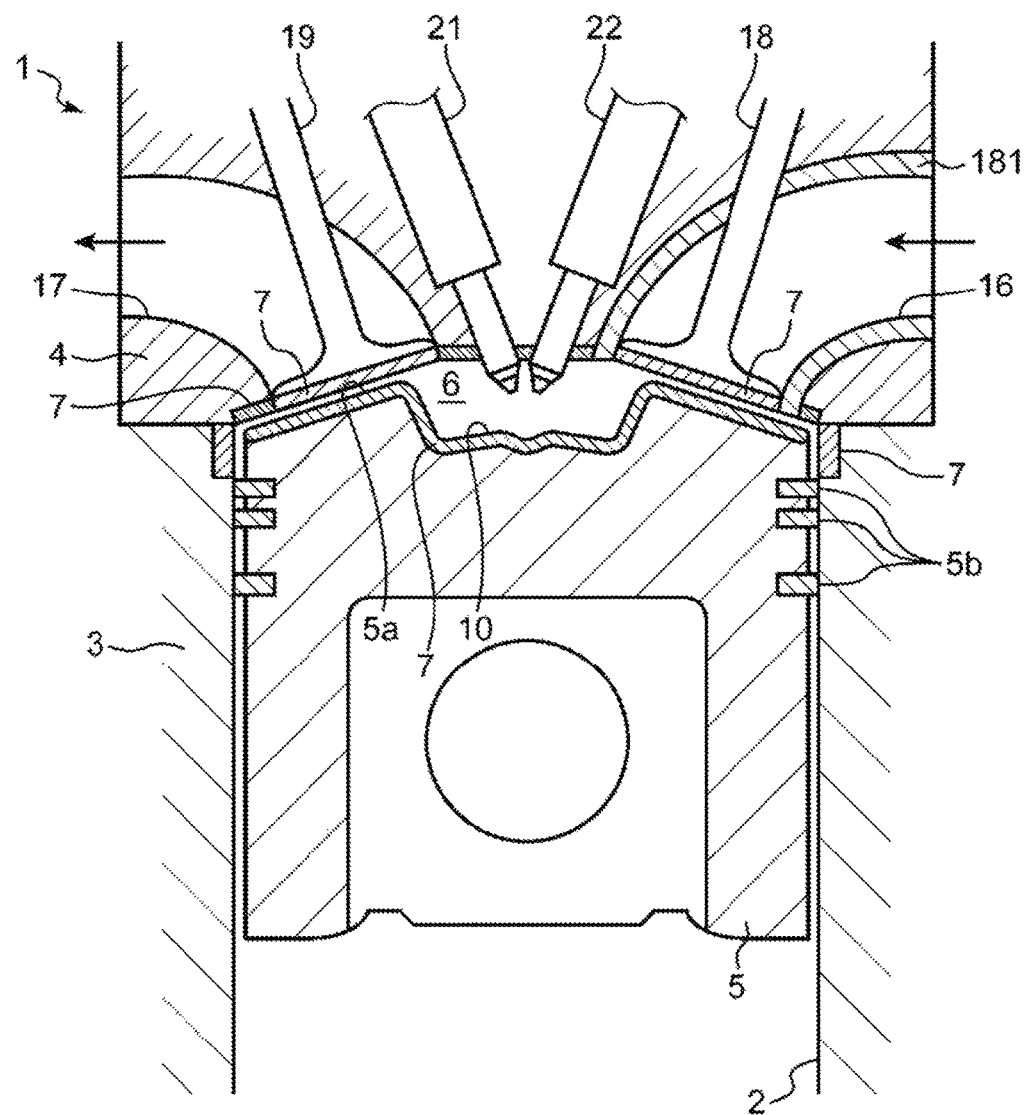
FIG. 4 is an enlarged cross-sectional view schematically illustrating a part of an engine body.

FIG. 4 is an enlarged cross-sectional view illustrating a part of the engine body 1. As illustrated in FIG. 4, the engine body 1 includes a cylinder block 3 formed therein with the cylinders 2, a cylinder head 4 formed on the cylinder block 3, and pistons 5 fitted into the cylinders 2 to be reciprocatable (in up-and-down directions), respectively.

The combustion chamber 6 is formed above each piston 5. The combustion chamber 6 is a so-called pent-roof type, and a ceiling surface of the combustion chamber 6 (a bottom surface of the cylinder head 4) has a triangular roof shape formed by two inclining surfaces on an intake side and an exhaust side.

In this embodiment, to reduce a cooling loss by reducing release of heat of the combustion gas from the combustion chamber 6 to the outside of the combustion chamber 6, wall surfaces (inner surfaces) of each combustion chamber 6 are provided with heat insulating materials 7 having a lower thermal conductivity than the inner surfaces of the combustion chamber 6. Specifically, the heat insulating material 7 is provided to each of a wall surface of the cylinder 2, a crown surface 5a of the piston 5, the bottom surface of the cylinder head 4, and surfaces of valve heads of intake and exhaust valves 18 and 19, which form the inner surfaces of the combustion chamber 6. Note that in this embodiment, as illustrated in FIG. 4, a position of the heat insulating material 7 provided in the wall surface of the cylinder 2 is limited to be higher (cylinder head 4 side) than piston rings 5b in a state where the piston 5 is at a top dead center (TDC), so that the piston rings 5b do not slide on the heat insulating material 7.

A specific material of the heat insulating material 7 is not limited as long as it has the low thermal conductivity as described above. However, the heat insulating material 7 is preferably made from a material having lower volumetric specific heat than the inner surfaces of the combustion chamber 6. Specifically, when the engine body 1 is cooled by a coolant, a gas temperature within the combustion chamber 6 varies as a combustion cycle progresses, whereas temperatures of the inner surfaces of the combustion chamber 6 are substantially fixed. Therefore, the cooling loss becomes large due to this temperature difference. For this reason, by making the heat insulating material 7 from a material having the low volumetric specific heat, the temperature of the heat insulating material 7 changes corresponding to the variation of the gas temperature within the combustion chamber 6, and as a result, the cooling loss can be reduced.

For example, the heat insulating materials 7 are formed by coating the inner surfaces of the combustion chamber 6 with a ceramic material (e.g., $ZrO_2$) in a manner using plasma thermal spraying. Note that the ceramic material may have multiple pores so that the thermal conductivity and volumetric specific heat of the heat insulating material 7 become even lower.

The crown surface 5a of each piston 5 has a cavity 10 formed by denting to an opposite side from the cylinder head 4 (downward) an area including a center of the crown surface 5a. The cavity 10 is formed to have a volume corresponding to a major part of the combustion chamber 6 when the piston 5 is at the TDC.

In this embodiment, a geometric compression ratio of the engine body 1, in other words, a ratio of a volume of the combustion chamber 6 when the piston 5 is at a bottom dead center (BDC) to a volume of the combustion chamber 6 when the piston 5 is at the TDC is set to be between 18:1 and 35:1 (e.g., about 20:1).

The cylinder head 4 is formed with intake ports 16 for introducing air (fresh air and, depending on an operating state of the engine, the EGR gas) supplied from the intake passage 30 into the respective combustion chambers 6, and exhaust ports 17 for guiding out the exhaust gas generated within the respective combustion chambers 6 to the exhaust passage 40. The cylinder head 4 is further provided with the intake valves 18 for opening and closing the respective intake ports 16 on the combustion chamber 6 side, and the exhaust valves 19 for opening and closing the respective exhaust ports 17 on the combustion chamber 6 side. In this embodiment, one intake port 16 and one exhaust port 17 are formed for each cylinder 2, and one intake valve 18 and one exhaust valve 19 are provided for each cylinder 2. Note that, in the example of FIG. 4, an inner surface of each intake port 16 is also formed with a heat insulating layer 181.

The intake valves 18 are opened and closed by an intake valve timing mechanism. The intake valve timing mechanism is provided with intake variable valve timing mechanisms 18a (see FIG. 8) capable of changing open and close timings of the respective intake valves 18, and the open and close timings of the intake valves 18 are changed according to an operation condition, etc.

Further, fuel injectors 21 for injecting the fuel into the combustion chambers 6 and the water injectors 22 for injecting the supercritical water into the combustion chambers 6, respectively, are attached to the cylinder head 4. As illustrated in FIG. 4, the fuel injector 21 and the water injector 22 for the same combustion chamber 6 are arranged adjacent to each other so that tip parts (end parts on the combustion chamber 6 side) of the injectors are located near a center axis of a corresponding cylinder 2 and oriented toward a substantially center portion of the cavity 10.

Note that in this embodiment, a premixed charge compression self-ignition combustion is performed, in which the fuel and air are premixed to form a mixture gas and the mixture gas is caused to self-ignite near the TDC on compression stroke (CTDC) throughout all operating ranges of the engine body. Accordingly, in the example of FIG. 4, ignition plugs for igniting the mixture gas within the combustion chambers 6 are not provided to the engine body 1; however, in a case where an additional ignition power is required for suitable combustion of the mixture gas in a cold start etc., the ignition plugs may suitably be provided to the engine body 1.

Each water injector 22 injects the supercritical water (hereinafter, may simply be referred to as the "water" unless otherwise defined) sent from the water injection pump 63 into the combustion chamber 6, as described above. The water injector 22 has an injection port at its tip part, and a water injection amount is adjusted by changing an open period of the injection port. As the water injector 22, for example, an injector for injecting fuel into the combustion chamber 6, which is used in conventional engines, may be applied, and description of a specific structure thereof is omitted. Note that the water injector 22 injects the supercritical water into the combustion chamber 6 at about 20 MPa, for example.

As described above, the water injector 22 is arranged so that the tip part thereof is located near the center axis of the cylinder 2 and oriented toward the substantially center portion of the cavity 10. Accordingly, the supercritical water is injected from the tip part of the water injector 22 toward the crown surface 5a.

Each fuel injector 21 injects the fuel sent from a fuel pump (disposed out of the range of the drawings) into the combustion chamber 6. In this embodiment, the fuel injector 21 is an outward opening valve type.

(2-2) Specific Structure of Fuel Injector

The fuel injector 21 is described in detail.

Figure 5:
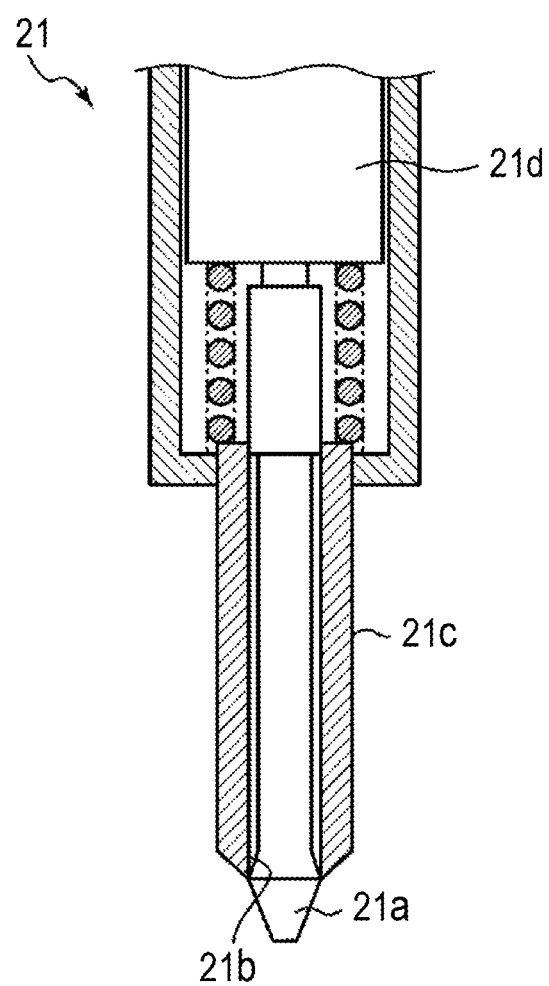
FIG. 5 is a cross-sectional view schematically illustrating a fuel injector.

FIG. 5 is a cross-sectional view schematically illustrating the fuel injector 21. As illustrated in FIG. 5, the fuel injector 21 has a fuel tube 21c formed with a nozzle port 21b at the tip part (end part on the combustion chamber 6 side) thereof, and an outward opening type valve 21a disposed inside of the fuel tube 21c and for opening and closing the nozzle port 21b. The outward opening type valve 21a is connected with a piezo element 21d for deforming according to voltage applied thereto. When voltage is not applied to the piezo element 21d, the outward opening type valve 21a contacts with the nozzle port 21b to close it. When voltage is applied to the piezo element 21d, the piezo element 21d deforms accordingly and the outward opening type valve 21a protrudes from the nozzle port 21b to the tip side to open it.

Each of the nozzle port 21b and a part of the outward opening type valve 21a contacting with the nozzle port 21b has a tapered shape in which a radius becomes larger toward the tip, and the fuel is injected from the nozzle port 21b in a cone shape (specifically, a hollow cone shape) centering on a center axis of the nozzle port 21b (i.e., substantially on the center axis of the cylinder 2). For example, the tapered angle of the cone is between 90° and 100° (the tapered angle of the hollow of the cone is about 70°).

An open period and lift of the outward opening type valve 21a (the lift is a protruding amount of the outward opening type valve 21a from a closing position thereof and is an opening of the nozzle port 21b) change according to an apply period of voltage to the piezo element 21d and a magnitude of the voltage. Further, penetration (reach, penetrating distance of spray tip) of the fuel spray injected from the nozzle port 21b, the fuel injection amount per unit time, and a particle size of the fuel spray change according to the lift of the outward opening valve type 21a. Specifically, when the lift is increased and the nozzle port 21b opens wider, the penetration of the fuel spray becomes longer, and the fuel injection amount per unit time increases as well as the particle size of the fuel spray becomes large.

According to the above structure, the fuel injector 21 is capable of performing multiple injections including about twenty injections in 1 to 2 msec. Further, the fuel injector 21 is capable of controlling a spread of the fuel spray in radial directions of the fuel injector 21 (perpendicular to the axial direction of the fuel injector 21) and the fuel spray in the axial direction individually, by changing the interval of the fuel injections and the lift.

A specific description regarding this matter is given with reference to FIGS. 6A to 7B.

Figure 6A:
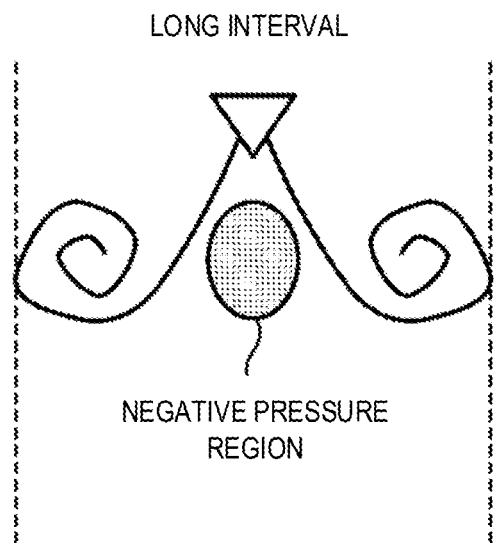
FIG. 6A is a conceptual view illustrating a spread of fuel spray when an injection interval of fuel is long.
Figure 6B:
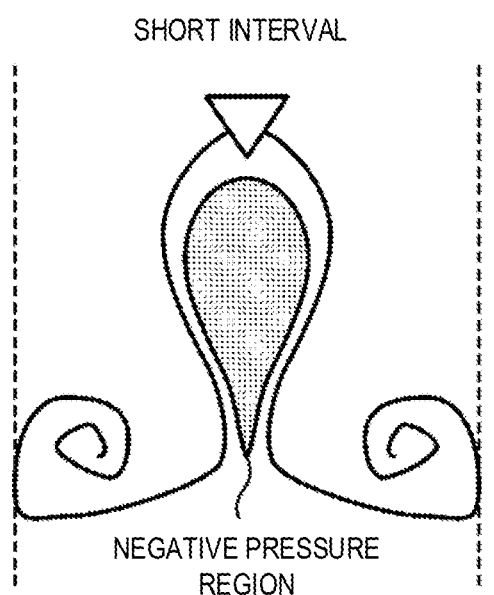
FIG. 6B is a conceptual view illustrating spread of the fuel spray when the injection interval of the fuel is short.

FIGS. 6A and 6B are conceptual views illustrating a difference in the spread of the fuel spray caused by changing the injection interval of the fuel injector 21. Specifically, FIG. 6A is the view for when the injection interval of the fuel is long, and FIG. 6B is the view for when the injection interval of the fuel is short while having the same lift as FIG. 6A.

As apparent from comparison between FIGS. 6A and 6B, the spread of the fuel spray in the axial direction is stimulated more when the injection interval of the fuel is short.

Specifically, the fuel spray injected in the hollow cone shape from the fuel injector 21 flows within the combustion chamber 6 at a high speed. Here, a negative pressure region is produced within the hollow cone in the axial direction of the fuel injector 21 due to the Coanda effect, and the fuel spray is drawn toward the negative pressure region. Here, when the fuel injection interval is long as illustrated in FIG. 6A, pressure within the negative pressure region resumes in a period between a predetermined fuel injection and the next fuel injection thereto. Therefore, the negative pressure region does not extend significantly in the axial direction. On the other hand, when the fuel injection interval is short as illustrated in FIG. 6B, the pressure resumption within the negative pressure region is interrupted and the negative pressure region extends in the axial direction. Therefore, the fuel spray extends farther in the axial direction of the fuel injector 21 when the fuel injection interval is short.

Figure 7A:
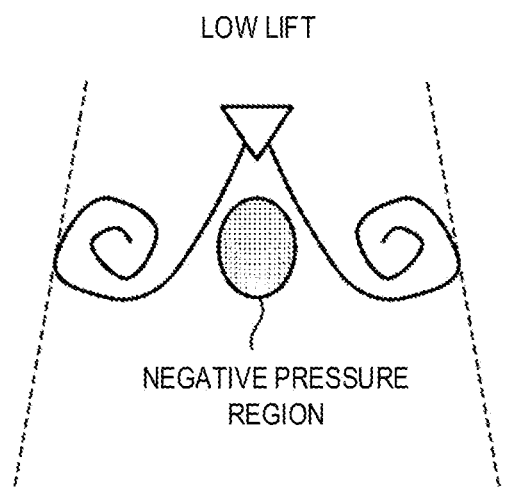
FIG. 7A is a conceptual view illustrating spread of the fuel spray when a lift of the fuel injector is low.
Figure 7B:
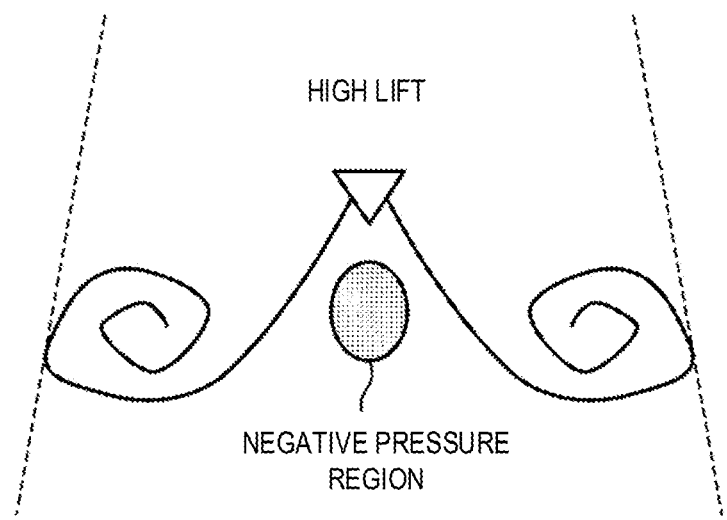
FIG. 7B is a conceptual view illustrating spread of the fuel spray when the lift of the fuel injector is high.

FIGS. 7A and 7B are conceptual views illustrating a difference in the spread of the fuel spray caused by changing the lift of the fuel injector 21. Specifically, FIG. 7A is the view for when the lift is low, and FIG. 7B is the view for when the lift is high while having the same injection interval as FIG. 7A.

As apparent from comparison between FIGS. 7A and 7B, the spread of the fuel spray in the radial directions (perpendicular to the axial direction of the fuel injector 21) is stimulated more when the lift of the fuel injector 21 is high.

Specifically, when the lift is high, the particle size of the fuel spray becomes large as described above and momentum of the fuel spray increases. Therefore, when the lift is high, compared to when the lift is low, it becomes more difficult for the fuel spray to be drawn to the negative pressure region and the fuel spray spreads outward in the radial directions more.

(3) Control System
(3-1) System Configuration

Figure 8:
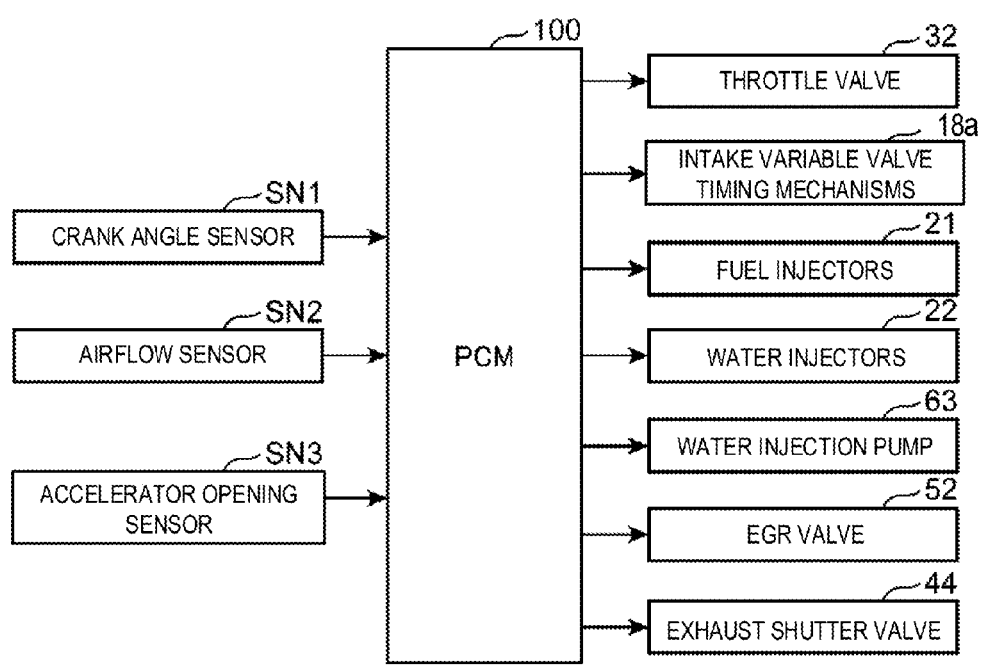
FIG. 8 is a block diagram illustrating a control system of the engine.

FIG. 8 is a block diagram illustrating a control system of the engine. As illustrated in FIG. 8, the engine system of this embodiment is controlled by a Powertrain Control Module (PCM, may be referred to as the controller) 100 as a whole. The PCM 100 is, as is well-known, comprised of a microprocessor including a CPU, a ROM, and a RAM.

The PCM 100 is electrically connected with various sensors for detecting an operating state of the engine.

For example, the cylinder block 3 is provided with a crank angle sensor SN1 for detecting a rotational angle and speed of a crankshaft, in other words, an engine speed. Further, an airflow sensor SN2 for detecting an air amount (fresh air amount) to be sucked into the cylinders 2 through the air cleaner 31 is provided in the intake passage 30, between the air cleaner 31 and the throttle valve 32. Moreover, an accelerator opening sensor SN3 for detecting a position of an accelerator pedal (accelerator opening) which is disposed out of the range of the drawings and controlled by a driver of the vehicle is provided to the vehicle.

The PCM 100 controls respective parts of the engine while performing various determinations, operations etc. based on input signals from the various sensors (parameters). Specifically, the PCM 100 is electrically connected with the fuel injectors 21, the water injectors 22, the throttle valve 32, the exhaust shutter valve 44, the EGR valve 52, the water injection pump 63, etc., and outputs control signals to these components based on results of the operations, etc.

Figure 9:
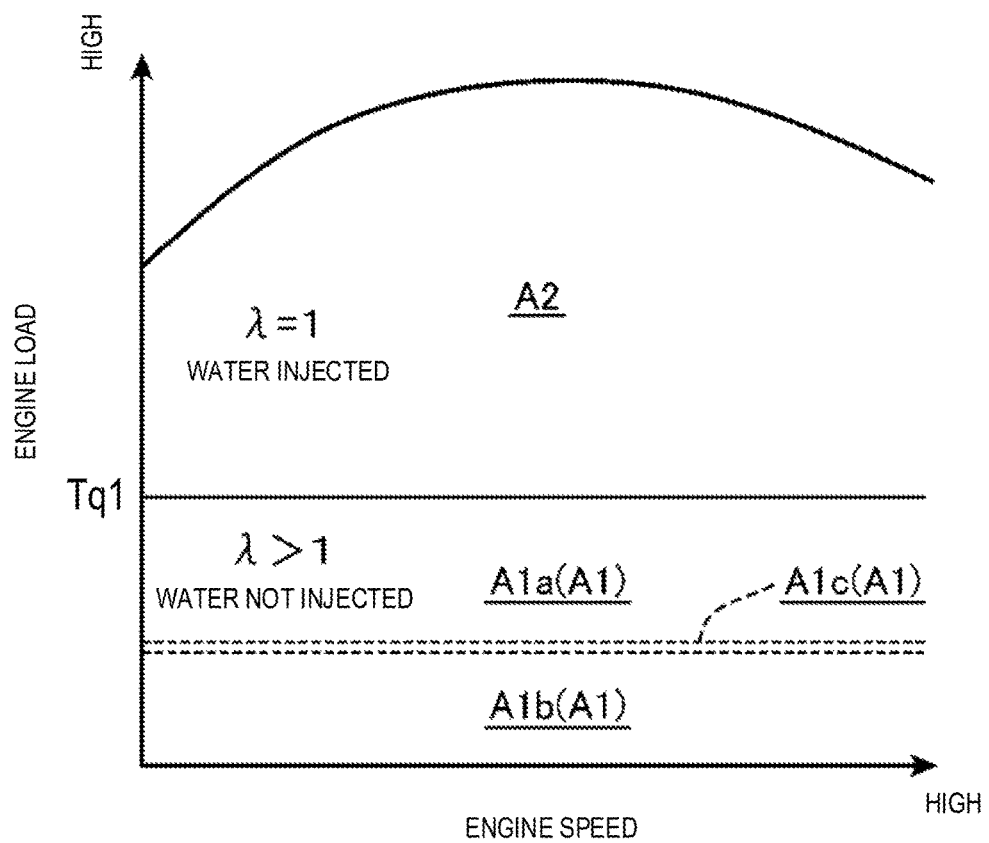
FIG. 9 is a chart illustrating a control range of the engine.

FIG. 9 is a control map of which a horizontal axis indicates the engine speed and a vertical axis indicates an engine load. In this embodiment, a low engine load range A1 where the engine load is a predetermined reference load Tq1 or below, and a high engine load range A2 where the engine load is higher than the reference load Tq1 are set as control ranges. Hereinafter, contents of the control in the respective ranges A1 and A2 are described.

Here, the PCM 100 includes an engine load determining module for receiving the parameters (input signals) and determining whether the operating range of the engine body is within the low engine load range A1 or the high engine load range A2. Note that the number of the parameters is not limited, as long as it includes a parameter of the engine load obtained based on the accelerator opening.

(3-2) Low Engine Load Range

Within the low engine load range A1, a requested engine torque is low, and thus, an effective compression ratio may be set small. Therefore, within the low engine load range A1, the effective compression ratio is set to a low value so as to reduce a pumping loss and increase energy efficiency. For example, the effective compression ratio is reduced smaller than 15:1. Specifically, each intake valve 18 is closed at a comparatively retarded timing on a retarding side of the BDC on intake stroke by the intake variable valve timing mechanism 18a, and thus, the effective compression ratio is reduced.

Within the low engine load range A1, since a heat generation amount of the mixture gas is small and a combustion temperature is comparatively low, an amount of $NO_x$ (so-called Raw $NO_x$) produced by the combustion becomes low. Thus, within this range A1, there is no need to purify $NO_x$ by the three-way catalyst 41, and an air-fuel ratio is not required to be a theoretical air-fuel ratio at which the $NO_x$ can be purified by the three-way catalyst. Therefore, within the low engine load range A1, the air-fuel ratio of the mixture gas is set to be lean, in other words, an air excess ratio $\lambda>1$, so as to improve a fuel consumption.

Within the low engine load range A1, the EGR gas is recirculated into the cylinder 2. Specifically, within the low engine load range A1, the EGR valve 52 is opened, and a portion of the exhaust gas inside the exhaust passage 40 is recirculated to the intake passage 30, as the EGR gas. Moreover, within an engine operating range where the engine load is extremely low and pressure inside the exhaust passage 40, in other words, pressure on the upstream side of the EGR passage 51, is low, the opening of the exhaust shutter valve 44 is narrowed and the EGR gas recirculation is stimulated.

In this embodiment, within the low engine load range A1, the EGR gas is recirculated so that a G/F which is a ratio of a total gas weight within the combustion chamber 6 to a fuel amount becomes 35 or above. Further, an EGR ratio (a ratio of a weight of the EGR gas to a weight of all gases inside the cylinder 2) is increased as the engine load becomes higher.

Within the low engine load range A1, the supercritical water injection into the combustion chamber 6 by the water injector 22 is stopped. Accordingly, the drive of the water injection pump 63 is stopped.

Further within the low engine load range A1, in a latter half of the compression stroke (between 90° CA before the CTDC and the CTDC), all the fuel for one combustion cycle is injected into the combustion chamber 6 by the fuel injector 21. For example, all the fuel is injected into the combustion chamber 6 near 30° CA before the CTDC.

The injection mode of the low engine load range A1 is a mode in which the fuel does not attach to the crown surface 5a of the piston 5 and a layer of air is formed within an outer circumferential region of the combustion chamber 6. Here, the outer circumferential region of the combustion chamber 6 indicates a region near the crown surface 5a of the piston 5 (the surface of the heat insulating material 7 on the crown surface 5a), the inner surface of the cylinder 2 (the surface of the heat insulating material 7 on the inner surface), and the bottom surface of the cylinder head 4.

Specifically, within the low engine load range A1, a first segment A1a where the engine load is low, a second segment A1b where the engine load is higher than the first segment A1a, and a switch segment A1c between the first and second segments A1a and A1b are set. Injection modes within these segments are a low load injection mode, a medium load injection mode, and a switch segment injection mode, respectively, as described below.

Figures 10A, 10B, 10C:
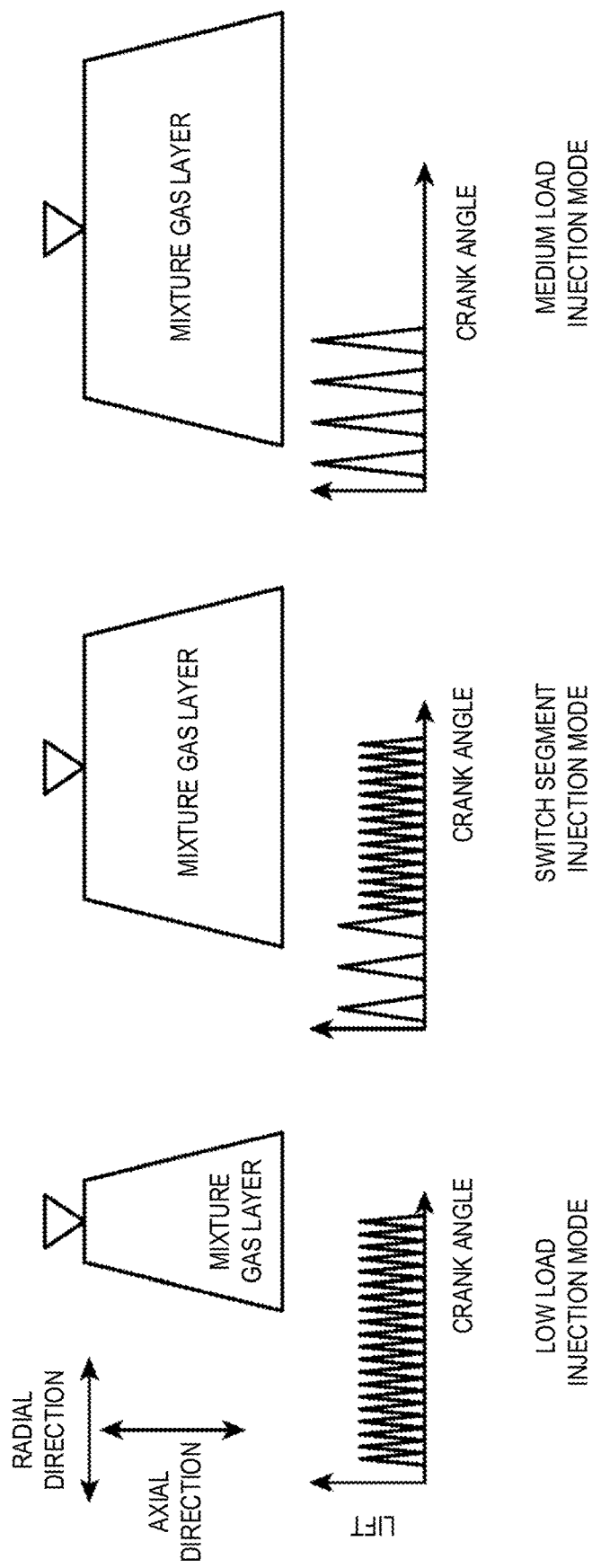
FIG. 10A is a view illustrating an injection pattern and a shape of a mixture gas layer in a low load injection mode.
FIG. 10B is a view illustrating an injection pattern and a shape of the mixture gas layer in a switch segment injection mode.
FIG. 10C is a view illustrating an injection pattern and a shape of the mixture gas layer in a medium load injection mode.

FIGS. 10A, 10B, and 10C are views illustrating fuel injection patterns and shapes of mixture gas layers in the low load injection mode, the switch segment injection mode, and the medium load injection mode, respectively.

(Low Load Injection Mode)

FIG. 10A illustrates the low load injection mode applied within the first segment A1a. In the low load injection mode, a plurality of injections are continuously performed with a low lift of the fuel injector 21 and at a short injection interval. Note that the number of the injections may suitably be changed without being limited to the example of FIG. 10A.

As described above, when the injection interval is short, the penetration of the fuel spray extends in the axial direction. Further, when the lift is low, the spread of the fuel spray in the radially outward directions is interrupted. Therefore, in the low load injection mode, the fuel spray and a layer of the mixture gas of the fuel spray and air have a shape relatively longer in the axial direction than the radial directions (axially long shape).

Thus, within the first segment A1a, since the axially-long mixture gas layer is formed within the combustion chamber 6, an air layer is formed within a radially outer region of the combustion chamber 6. Moreover, within the first segment A1a, the fuel injection amount is small. Therefore, even though the mixture gas layer has the axially long shape, the axial length is short, contact between the crown surface 5a of the piston 5 and the mixture gas is avoided, and the air layer is formed over the entire crown surface 5a of the piston 5.

(Medium Load Injection Mode)

FIG. 10C illustrates the medium load injection mode applied within the second segment A1b. In the medium load injection mode, a plurality of injections are continuously performed with a higher lift of the fuel injector 21 and at a longer injection interval compared to the low load injection mode. Note that the number of the injections may suitably be changed without being limited to the example of FIG. 10C.

As described above, when the injection interval is long, the penetration of the fuel spray becomes short in the axial direction. Further, when the lift is high, the fuel spray spreads in the radially outward directions. Therefore, in the medium load injection mode, the fuel spray and the mixture gas layer have a shape relatively longer in the radial directions than the axial direction (radially long shape).

Thus, within the second segment A1b where the fuel injection amount is comparatively large, since the radially-long mixture gas layer is formed within the combustion chamber 6, the contact between the crown surface 5a of the piston 5 and the mixture gas is avoided, and an air layer is formed on the crown surface 5a of the piston 5. Further, the combustion chamber 6 near the CTDC has a longer dimension in the radial directions than the axial direction and is spacious in the radial directions. Therefore, within the second segment A1b, although the mixture gas layer has the radially long shape as described above, the mixture gas layer does not reach the radially outer region of the combustion chamber 6 (i.e., the inner surface of the cylinder 2), and an air layer is also formed within the radially outer region.

(Switch Segment Injection Mode)

FIG. 10B illustrates the switch segment injection mode applied within the third segment A1c. The switch segment injection mode is configured by combining the low and medium load injection modes with each other. For example, as illustrated in FIG. 10B, after the injections in the medium load injection mode (the plurality of injections with the high lift and at the long injection interval) are performed, the injections in the low load injection mode (the plurality of injections with the low lift and at the short injection interval) are performed. Note that the injections in the medium load injection mode may alternatively be performed after the injections in the low load injection mode. Further, the number of the injections may suitably be changed without being limited to the example of FIG. 10B.

In the switch segment injection mode, by combining the low and medium load injection modes with each other, the spread of the mixture gas layer especially in the radial directions is adjusted. As a result, a radial shape of the mixture gas layer in this mode becomes longer than the low load injection mode but shorter than the medium load injection mode.

Thus, within the third segment A1c which is a boundary segment between the first and second segments A1a and A1b, the shape of the mixture gas is suitably adjusted and the air layer is formed both on the crown surface 5a of the piston 5 and within the radially outer region of the combustion chamber 6.

Note that the switch segment injection mode may be omitted.

As above, within the low engine load range A1, the air layer (i.e., a heat insulating layer made of air) is formed in the outer circumferential region of the combustion chamber 6. Further, a cooling loss is reduced by this air layer, and the fuel consumption is improved.

Here, due to the air layer formed within the outer circumferential region of the combustion chamber 6 as above, the air-fuel ratio within an inner circumferential region (i.e., center region) of the combustion chamber 6 is larger than that within the outer circumferential region. However, within the low engine load range A1, as described above, the air excess ratio λ is set larger than 1 and excess air which does not contribute in the combustion exists. Therefore, required air for the combustion is secured within the center region of the combustion chamber 6, and the air-fuel ratio therewithin is adjusted to settle within a suitable range.

(3-3) High Engine Load Range

Within the high engine load range A2, the effective compression ratio is set larger than that within the low engine load range A1 to secure sufficient engine torque. In this embodiment, the effective compression ratio is set to be 15:1 or above within the high engine load range A2. Specifically, the close timing of each intake valve 18 is advanced than that within the low engine load range A1 by the intake variable valve timing mechanism 18a, and thus, the effective compression ratio is set larger than that within the low engine load range A1.

Within the high engine load range A2, the air-fuel ratio is set to be the theoretical air-fuel ratio so that the $NO_x$ can be purified by the three-way catalyst. In other words, the air excess ratio λ is 1. Further, within the high engine load range A2, the EGR valve 52 is closed to stop the EGR gas recirculation, and the G/F is set to a value lower than 35.

Here, within the high engine load range A2, since the amount of fuel injected into the combustion chamber 6 is large and the required amount of air for combusting this fuel increases accordingly, the amount of excess air becomes insufficient. Particularly in this embodiment, since the air excess ratio λ is set to 1, the excess air does not exist. Therefore, when the air layer is formed within the outer circumferential region of the combustion chamber 6 similar to within the low engine load range A1, the mixture gas of which air-fuel ratio is excessively large is formed within the combustion chamber 6 and a smoke production may increase. Further, within the high engine load range A2, since the fuel injection amount is large and the heat generation amount is large, the temperature within the combustion chamber 6 increases. Moreover, in this embodiment, since the effective compression ratio is large, the temperature within the combustion chamber 6 increases even more. Therefore, within the high engine load range A2, the smoke is easily produced and, thus, if a rich area, in other words, an area with a small air excess ratio, is formed under such a condition, a large amount of smoke may be produced.

For these reasons, in this embodiment, within the high engine load range A2, instead of forming the air layer formed within the low engine load range A1, a heat insulating layer is formed by the supercritical water as described later. Further, to suppress the increase of the smoke production, the fuel is injected so that the combustion starts in a state where the mixture gas within the combustion chamber 6 is homogenized more (with an even air-fuel ratio).

Moreover, within the high engine load range A2, since the heat generation amount is large and the effective compression ratio is large as described above, if the combustion starts before the CTDC, an absolute value of an in-cylinder pressure (pressure within the combustion chamber 6) and an increase rate of the in-cylinder pressure become extremely high and combustion noise becomes loud. Therefore, in this embodiment, the fuel is injected so that the combustion starts on a retarding side of the CTDC, in other words, while the piston 5 descends and the in-cylinder pressure decreases.

Figure 11:
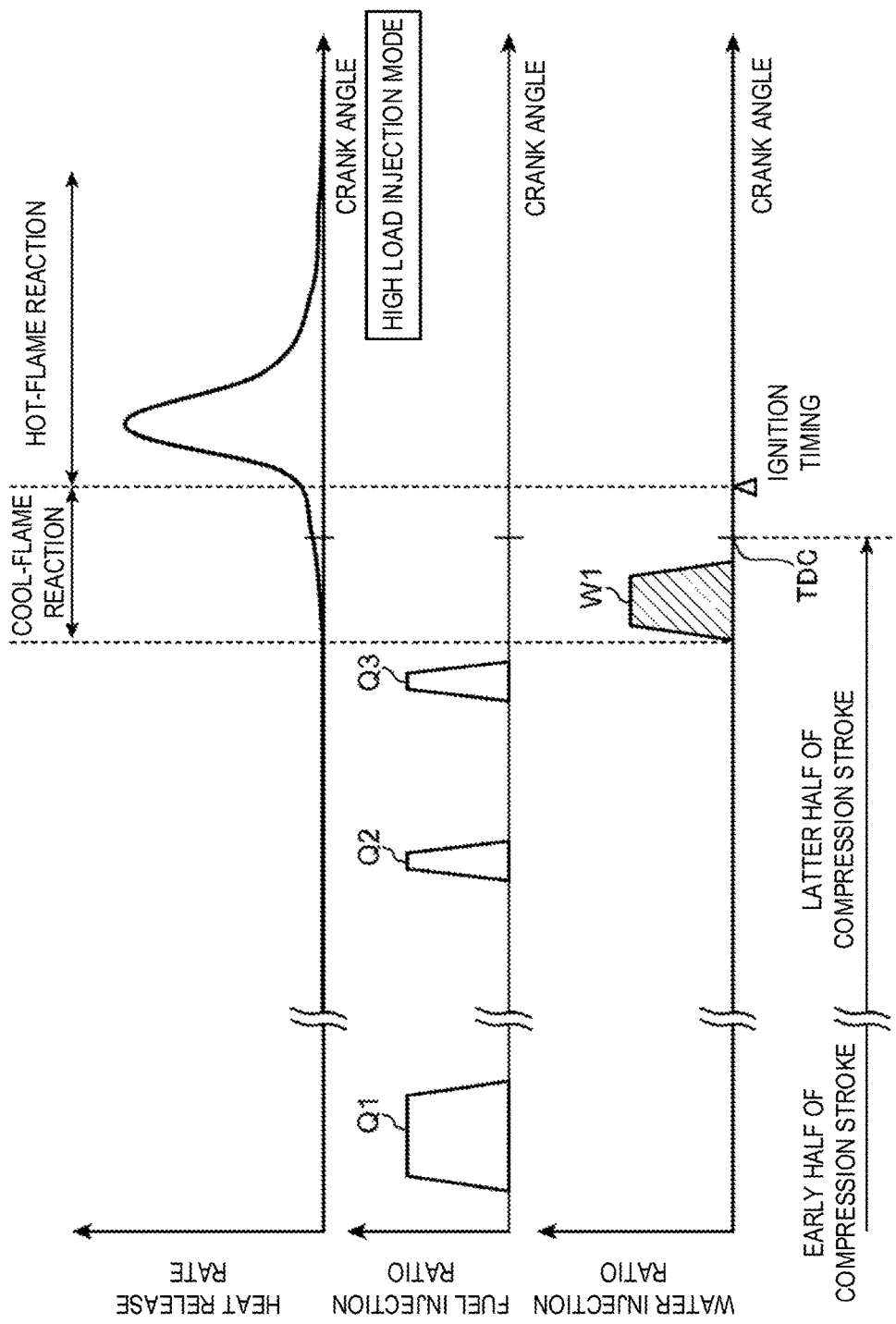
FIG. 11 shows charts illustrating a heat release rate, a fuel injection ratio, and a water injection ratio, respectively, within a high engine load range.

Specifically, within the high engine load range A2, fuel injections in a high load injection mode as illustrated in FIG. 11 are performed. That is, a first injection Q1 in which a comparatively large amount of fuel is injected in an early half of the compression stroke (between the BDC on the intake stroke and 90° CA before the CTDC) is performed, a second injection Q2 in which a portion of the rest of the fuel is injected in the latter half of the compression stroke is performed, and then a third injection Q3 in which the rest of the fuel is injected at a timing slightly on the advancing side of the CTDC but on the retarding side of the second injection Q2 is performed.

The first injection Q1 is for homogenizing the mixture gas. By performing the first injection Q1 to inject the large amount of fuel in the early half of the compression stroke and mix it with air, the mixture gas within the combustion chamber 6 before the combustion starts is homogenized. The first injection Q1 starts, for example, near 150° CA before the CTDC.

The third injection Q3 is for retarding the self-ignition of the mixture gas even more. By performing the third injection Q3 at the timing slightly on the advancing side of the CTDC, the homogeneous mixture gas generated by the first injection Q1 self-ignites after the CTDC. The third injection Q3 starts, for example, near 15° CA before the CTDC.

The second injection Q2 is for increasing combustion stability. Specifically, if the rest of the fuel is all injected at the comparatively retarded timing which is near the CTDC by the third injection Q3, as the piston 5 descends, the temperature within the combustion chamber 6 may decrease to below a combustible temperature before the combustion starts, and as a result, a misfire may occur. Therefore, in this embodiment, the second injection Q2 is performed before the third injection Q3 so as to keep the temperature within the combustion chamber 6 at the combustible temperature or above even after the CTDC. The second injection Q2 is performed near 30° CA before the CTDC, for example.

Figure 12:
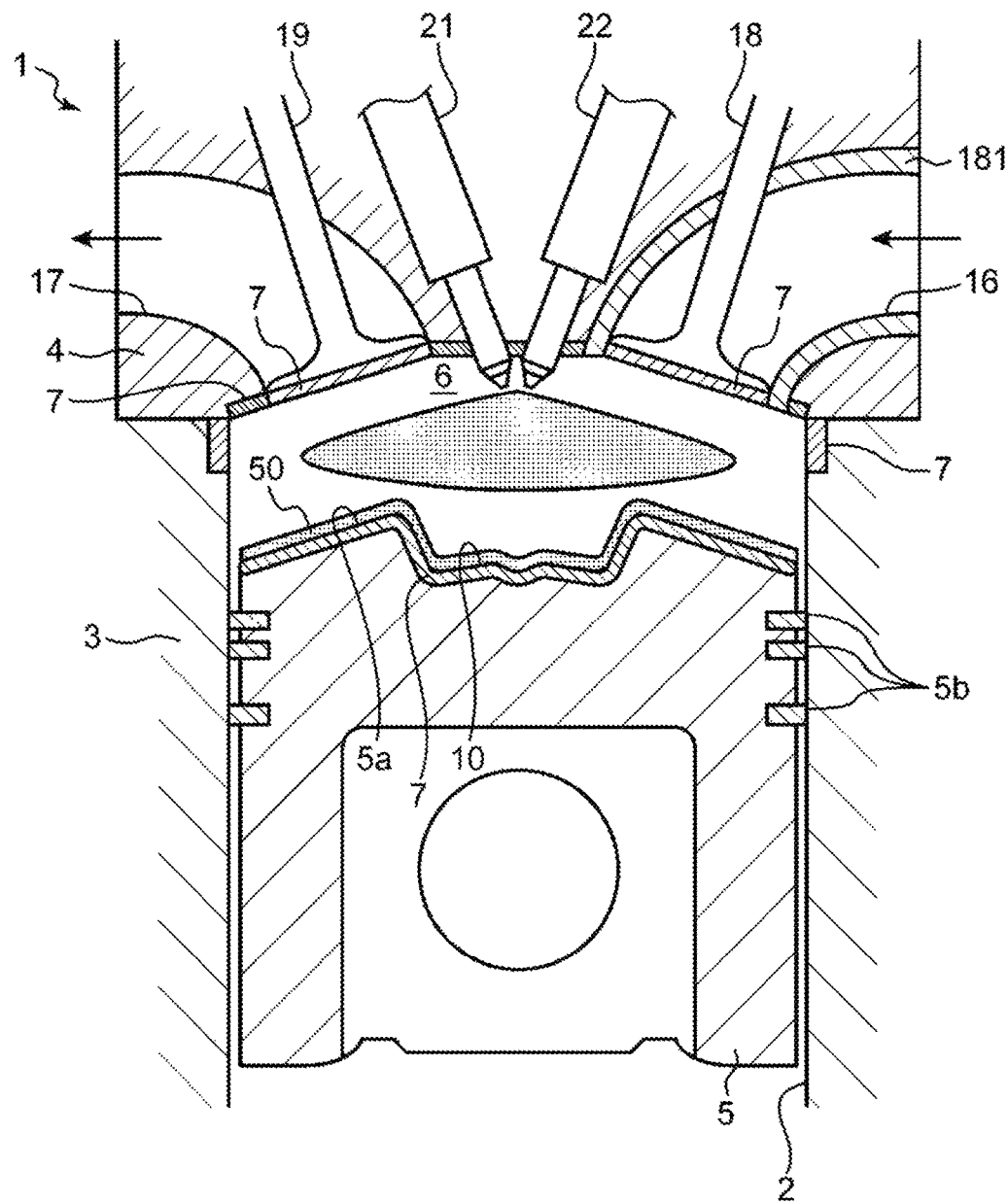
FIG. 12 is a view illustrating a state where a heat insulating layer is formed by supercritical water.

Further, within the high engine load range A2, the supercritical water is injected into the combustion chamber 6 by the water injector 22 so that a layer of supercritical water is formed in the outer circumferential region of the combustion chamber 6 as the heat insulating layer 50 (see FIG. 12).

Specifically, as illustrated in FIG. 11, a water injection W1 is performed at a timing that is between the latter half of the compression stroke and an early half of expansion stroke (between the CTDC and 90° CA after the CTDC), after the third injection Q3 is completed, and before the mixture gas ignites within the combustion chamber 6. In this embodiment, as illustrated in FIG. 11, the water injection W1 is performed before the CTDC.

As described above, the supercritical water is injected by the water injector 22 toward the piston crown surface 5a. Therefore, as illustrated in FIG. 12, within the high engine load range A2, by performing the water injection W1, the supercritical water is attached to the piston crown surface 5a to form the heat insulating layer 50. Particularly in this embodiment, since the water injection W1 is performed before the CTDC and while the piston 5 elevates, the supercritical water in the water injection W1 can be attached to the piston crown surface 5a more reliably. Note that a stippled area in FIG. 12 schematically indicates the state of the water injection W1.

Here, it may be considered to inject the water in the normal liquid phase as the substance to form the heat insulating layer 50, instead of the supercritical water (or subcritical water). However, the water in the normal liquid phase becomes water vapor (i.e., water in the gas phase) when injected into the combustion chamber 6 at a high temperature. Further, as described above, the water vapor has a low density. Therefore, even if the water in the normal liquid phase is injected to form the heat insulating layer with the water vapor, a weight (number of molecules) of water in the heat insulating layer is low and the heat insulating effect is low. Moreover, the water in the normal liquid phase requires latent heat to change into water vapor as described above. Thus, in the case of injecting the water in the normal liquid phase, the temperature of the mixture gas decreases due to water vaporization and thermal efficiency degrades.

Therefore, in this embodiment, as described above, the supercritical water which has a high density and does not require latent heat is injected into the combustion chamber 6, and this supercritical water injection is performed when the temperature and pressure of the combustion chamber 6 are high, which is between the latter half of the compression stroke and the early half of the expansion stroke, so that the injected water remains in the state of supercritical water before the mixture gas ignition. Further, while having the homogeneous mixture gas within the combustion chamber 6, the heat insulating layer 50 is formed in the outer circumferential region of the combustion chamber 6 before the mixture gas ignition.

Note that here, an ignition timing, i.e., a timing at which the mixture gas ignites, is a timing at which a heat release rate sharply rises as illustrated in FIG. 11. Specifically, as illustrated in FIG. 11, when the temperature and pressure of the mixture gas of the fuel and air reach predetermined values, first a reaction occurs, which is a low-temperature heat release reaction (cool-flame reaction) accompanying a slight heat generation to the extent that the cooling loss, etc. does not occur, and in which the heat release rate gradually increases or first gradually increases and then drops, and then a reaction accompanying a large heat generation and hot flame (hot-flame reaction) occurs. Here, the timing at which this hot-flame reaction starts is referred to as the ignition timing. Note that the hot-flame reaction is known to occur when the temperature of the mixture gas becomes about 1,500 K or above. Therefore, a timing at which the temperature of the mixture gas reaches or exceeds 1,500 K may be the ignition timing.

(4) Effects

As described above, in this embodiment, within the low engine load range A1, since the air layer is formed within the outer circumferential region of the combustion chamber 6 by the excess air, the cooling loss can be reduced while maintaining suitable combustion. Further within the high engine load range A2, since the heat insulating layer 50 is formed by the water within the outer circumferential region of the combustion chamber 6, the air-fuel ratio of the mixture gas is adjusted to settle within the suitable range to reduce the cooling loss while reducing the smoke production. Particularly since the heat insulating materials 7 are formed in the wall surfaces of the combustion chamber 6 in addition to the heat insulating layers made of air and water, the cooling loss can effectively be reduced.

Moreover, within the high engine load range A2, the heat insulating layer 50 is formed by the supercritical water, and this supercritical water is injected into the combustion chamber 6 at a high temperature and pressure, which is between the latter half of the compression stroke and the early half of the expansion stroke, so that the water remains in the state of supercritical water on the wall surface of the combustion chamber 6. Therefore, a water density of the heat insulating layer 50 is increased and a high heat insulating effect can be obtained. As a result, the cooling loss is reduced more reliably and the fuel consumption is improved more reliably.

Furthermore, in this embodiment, the supercritical water is generated by using the thermal energy of the exhaust gas. Within the high engine load range A2 where the exhaust gas temperature is high, the supercritical water is generated by effectively using the thermal energy of the exhaust gas, and the energy efficiency can be increased. On the other hand, within the low engine load range A1, since the exhaust gas temperature is low, a required amount of the supercritical water may not be generated. Moreover, in a case of compensating for a lack of energy by, for example, a heater provided separately within the low engine load range A1, the energy efficiency degrades. In this regard, in this embodiment, the heat insulating layer is formed by air within the low engine load range A1, and the heat insulating layer 50 is formed by the supercritical water only within the high engine load range A2. Therefore, the cooling loss can be reduced over a wide engine load range while increasing the energy efficiency.

(5) Modifications

In this embodiment, the case where the effective compression ratio within the high engine load range A2 is set to be 15:1 or above is described; however, it is not limited to this. Note that, when the engine load is high and the effective compression ratio is large, the smoke production easily increases as described above. Therefore, in this case, by forming the heat insulating layer 50 with the supercritical water and not air, the increase of the smoke production can be suppressed while reducing the cooling loss. Similarly, the effective compression ratio within the low engine load range A1 is not limited to the above case.

Further, the supercritical water may be generated by using, for example, a heater provided separately as described above and omitting the exhaust heat recovery device 60. However, by using the exhaust heat recovery device 60 as described above, the energy efficiency can be increased.

Further, the heat insulating materials 7 may be omitted. However, by providing the heat insulating materials 7, the cooling loss can be reduced more effectively. Moreover, since the temperature of the exhaust gas increases by providing the heat insulating materials 7, the supercritical water or the subcritical water can easily be generated in the case of using the exhaust heat recovery device 60.

Further, in this embodiment, the case where the supercritical water is injected into the combustion chamber 6 as water is described; however, as described above, subcritical water which has properties similar to the supercritical water may be injected into the combustion chamber 6, instead of the supercritical water. Also in this case, the heat insulating layer with a high heat insulating effect can be formed and the cooling loss can be reduced.

Further, the combustion mode is not limited to the self-ignition combustion, and a mode in which the mixture gas is ignited by an ignition plug to start the combustion may be adopted. Moreover, the fuel may not include gasoline.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine Body
2 Cylinder
5 Piston
5*a* Piston Crown Surface
7 Heat Insulating Material
21 Fuel Injector
22 Water Injector
42 Heat Exchanger (Heater and Compressor)
43 Condenser
50 Heat Insulating Layer
60 Exhaust Heat Recovery Device (Water Processing Device)
100 PCM (Controller)

What is claimed is:
1. A control apparatus of a premixed charge compression ignition engine including an engine body and a cylinder into which a piston is reciprocatably fitted, comprising:

a fuel injector for injecting fuel into a combustion chamber formed inside the cylinder;

a water injector for injecting one of supercritical water and subcritical water into the combustion chamber; and a controller for controlling various parts of the engine, the various parts including the fuel injector and the water injector, wherein the water injector is attached to a predetermined position of the engine body to be capable of injecting the one of the supercritical water and the subcritical water toward a crown surface of the piston, wherein the controller includes an engine load determining module for receiving at least a parameter of a load of the engine obtained based on an accelerator opening, and determining whether an operating range of the engine body is within a low load range where the engine load is a predetermined reference load or below or a high load range where the engine load is above the predetermined reference load, wherein when the engine body is operated within the low load range, the controller outputs a control signal to the fuel injector to inject the fuel into a center region of the combustion chamber so as to form an air layer within an outer circumferential region of the combustion chamber, and wherein when the engine body is operated within the high load range, the controller outputs a control signal to the fuel injector to inject the fuel in a period between a latter half of compression stroke and an early half of expansion stroke, and the controller outputs a control signal to the water injector to inject the one of the supercritical water and the subcritical water toward the crown surface of the piston in a period that is after the fuel injection is completed and before a self-ignition of mixture gas containing the fuel and air.

2. The control apparatus of claim 1, wherein a geometric compression ratio of the engine body is set to be between 18:1 and 35:1, and an effective compression ratio of the engine body within the high load range is set to be between 15:1 and 30:1.

3. The control apparatus of claim 1, further comprising a water processing device for generating the one of the supercritical water and the subcritical water, the water processing device including:

a condenser for condensing water vapor contained within exhaust gas discharged from the engine body; and a heater and compressor for increasing the condensed water vapor in temperature and pressure by supplying thermal energy of the exhaust gas to the condensed water vapor.

4. The control apparatus of claim 1, wherein a heat insulating material is provided in at least one of wall surfaces of the combustion chamber.

5. The control apparatus of claim 2, further comprising a water processing device for generating the one of the supercritical water and the subcritical water, the water processing device including:

a condenser for condensing water vapor contained within exhaust gas discharged from the engine body; and a heater and compressor for increasing the condensed water vapor in temperature and pressure by supplying thermal energy of the exhaust gas to the condensed water vapor.

6. The control apparatus of claim 2, wherein a heat insulating material is provided on at least one of wall surfaces of the combustion chamber.

7. The control apparatus of claim 3, wherein a heat insulating material is provided on at least one of wall surfaces of the combustion chamber.

8. The control apparatus of claim 5, wherein a heat insulating material is provided on at least one of wall surfaces of the combustion chamber.

* * * * *